W. W. WORCESTER.
WIRE FABRIC.
APPLICATION FILED APR. 26, 1907.
908,827.
Patented Jan. 5, 1909.
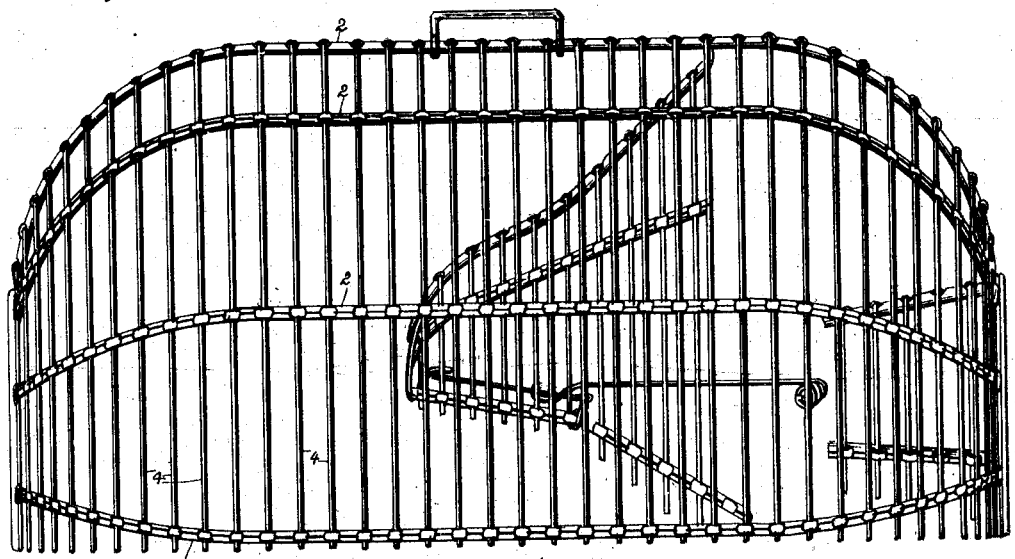
Fig. 1.
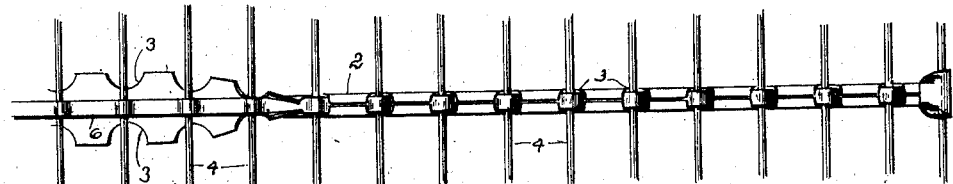
Fig. 2.
Fig. 3.
Fig. 4.
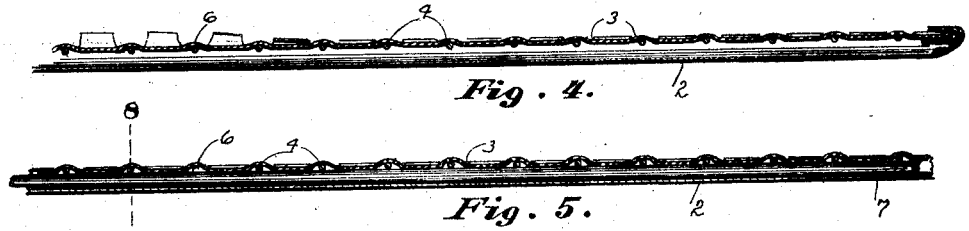
Fig. 5.
Fig. 6. Fig. 7. Fig. 8.
Witnesses
Harry O. Rostetter
Sylvia Boron.
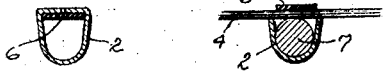
Inventor
William W. Worcester,
By F. W. Bond
Attorney.

UNITED STATES PATENT OFFICE.

WILLIAM W. WORCESTER, OF CANTON, OHIO.

WIRE FABRIC.

No. 908,827.  Specification of Letters Patent.  Patented Jan. 5, 1909.

Application filed April 26, 1907. Serial No. 370,511.

*To all whom it may concern:*

Be it known that I, WILLIAM W. WORCESTER, a citizen of the United States, residing at Canton, in the county of Stark and State of Ohio, have invented certain new and useful Improvements in Wire Fabric; and I do hereby declare that the following is a full, clear, and exact description of the same, reference being had to the accompanying drawing, making a part of this specification, and to the numerals and figures of reference marked thereon, in which—

Figure 1 is a side elevation of a trap made of this fabric. Fig. 2 is a view of one of the wire holding bars showing a portion of the bar folded and a portion unfolded, also showing a portion of the wires properly connected. Fig. 3 is a side view showing a portion of one of the wire holding bars showing the wires in cross section, also showing a portion of the wire strip holding blades folded. Fig. 4 is a longitudinal section through Fig. 3. Fig. 5 is a similar view illustrating the stiffening wire located in the wire holding bar. Fig. 6 is an enlarged sectional view on line 6—6, Fig. 3. Fig. 7 is an enlarged sectional view on line 7—7, Fig. 3. Fig. 8 is an enlarged sectional view on line 8—8, Fig. 5.

The present invention has relation to a wire fabric suited to various uses, but especially adapted to animal traps; and it consists in the novel arrangement of the parts of the fabric of the trap irrespective of the particular mechanism employed to trap the animal.

In the construction of animal traps such as shown in Fig. 1 it is of importance that a rigid frame be constructed, owing to the fact that it is composed principally of wires and the wires spaced from each other and connected to bars, which bars are shaped and spaced to produce a frame of the desired size. It of course will be understood that within the frame are to be located the devices common in animal traps, which devices within themselves form no particular part of the present invention.

Similar numerals of reference indicate corresponding parts in all the figures of the drawing.

In the accompanying drawing, 1 represents the lower bars of the frame and 2 the upper and middle bars, which are formed of a length to correspond substantially with the length of the trap proper. The upper and middle bars 2 are curved at their ends for the purpose of reducing the size of the frame and at the same time to partially close the ends of the frame, the bottom bars 1 are located substantially as shown in Fig. 1, and are of the same general construction as the upper and central bars, except they are less curved at their ends. The bars 1 and 2 are formed of sheet metal and their parallel edges provided with recesses 3, which recesses are spaced from each other a distance equal or substantially equal to the distance between the wires 4, which wires are arranged substantially as shown in Fig. 1. In the construction of fabric frames of the class to which this invention belongs it is of importance that a rigid frame be produced and in order that the bars 1 and 2 may be rigid when brought into their folded position they are bent into U-shape in cross section and are bent for the purpose of providing a convexo-concave integral portion, said convexo-concave portion serving to stiffen the bar and at the same time providing a means for constructing the bar of light material which will have sufficient rigidity to produce a rigid frame when the wires are connected as hereinafter described.

The bars 1 and 2 are brought into U-shape in transverse section and the wires 4 placed in the recesses 3 as best illustrated in Fig. 3, after which the strips of metal 6 are placed in the position illustrated in Fig. 2, and the portions of the bars between the recesses bent over and upon the strips 6, thereby securely binding the bars and wires together. For the purpose of increasing the rigidity of the bars, they may be provided with the inlaid wires 7, which wires are located as illustrated in Figs. 5 and 8, said wires lying in the trough of the bars 1 and 2.

For the purpose of connecting the bars at their ends, their portions extending beyond the last or end wire are bent around said wires as illustrated in Figs. 2, 3 and 4. It will be understood that after the wires have been placed in position and the metal of the bars bent or folded as above described there can be no displacement of the wires with reference to the bars and by forming the bars with the convexo-concave portions a rigid frame is produced.

It will be understood after bending the portions of the U-shaped bars between the recesses down and upon the binding strips 6, said binding strips will be snugly seated upon the wires 4 and the wires 4 snugly seated against the wires 7 located in the trough of the bars. In fact the exposed part of the binding strips and the bent over portions of the U-shaped bars will be substantially on the same plane By providing the flat strips 6 of a width to correspond substantially with the space between the inner faces of the U-shaped bars, said U-shaped bars will be held against inward movement, after the portions between the notches have been bent down upon the strips, thereby producing a rigid structure, which is of importance in such fabrics.

Having fully described my invention what I claim as new and desire to secure by Letters-Patent, is—

1. The combination in a wire fabric, of a bar substantially U-shape in cross-section and having recesses in its side flanges spaced apart from each other, wires located in said recesses, a strip or ribbon over said wires, and the parts of the metal of the side flanges of the U-shaped bar, between its recesses, being bent over said strip or ribbon and clenched against the same, said recesses being of less depth than said side flanges, whereby when the portions between the recesses are bent over said strip or ribbon, the wires between the side flanges of the U-shape bar and the said strip or ribbon are rigidly clenched, substantially as described.

2. The combination in a wire fabric, of a bar substantially U-shape in cross-section and having recesses in its side flanges spaced apart from each other, wires located in said recesses, a strip or ribbon over said wires, and the parts of the metal of the side flanges of the U-shaped bar, between its recesses, being bent over said strip or ribbon and clenched against the same, said recesses being of less depth than said side flanges, whereby when the portions between the recesses are bent over said strip or ribbon, the wires between the side flanges of the U-shape bar and the said strip or ribbon are rigidly clenched, and the exposed part of said strip or ribbon and the bent-over portions being substantially on the same plane, substantially as described.

3. The combination in a wire fabric, of a bar substantially U-shape in cross-section and having recesses in its side flanges spaced apart from each other, wires located in said recesses, a strip or ribbon over said wires, and the parts of the metal of the side flanges of the U-shaped bar, between its recesses, being bent over said strip or ribbon and clenched against the same, said recesses being of less depth than said side flanges, whereby when the portions between the recesses are bent over said strip or ribbon, the wires between the side flanges of the U-shape bar and the said strip or ribbon are rigidly clenched, and the bottom of the U-shape bar, at its end, being bent around the end of the said strip or ribbon and the end wire, substantially as described.

In testimony that I claim the above, I have hereunto subscribed my name in the presence of two witnesses.

WILLIAM W. WORCESTER.

Witnesses:
J. A. JEFFERS,
F. W. BOND.